United States Patent [19]

Ankeny

[11] 4,423,992
[45] Jan. 3, 1984

[54] SELF-RETAINING LOCKING ASSEMBLY FOR THREADED COUPLINGS

[76] Inventor: Alan E. Ankeny, 5320 Magnolia St., Philadelphia, Pa. 19144

[21] Appl. No.: 208,904

[22] Filed: Nov. 21, 1980

[51] Int. Cl.³ ............................................ F16B 39/282
[52] U.S. Cl. .................................... 411/223; 411/221
[58] Field of Search ............... 411/223, 221, 216–219, 411/321, 292, 222

[56] References Cited

U.S. PATENT DOCUMENTS

| | | | |
|---|---|---|---|
| 468,420 | 2/1892 | Rieger | 411/222 |
| 662,343 | 11/1900 | Bosworth | 411/221 X |
| 697,416 | 4/1902 | Sutherland | 411/219 |
| 906,475 | 12/1908 | Ullmann | 411/197 |
| 913,100 | 2/1909 | Burg | 411/223 X |
| 1,177,780 | 4/1916 | Kessel | 411/216 |
| 1,211,553 | 1/1917 | Dervoz | 411/217 |
| 1,235,205 | 7/1917 | Kierstead | 411/221 |
| 1,469,131 | 9/1923 | Whiteside | 411/223 |
| 1,595,026 | 8/1926 | Sherman | 411/221 |
| 3,294,141 | 12/1966 | Schotthoefer et al. | 411/222 |
| 4,114,250 | 9/1978 | Dent | 411/221 X |

FOREIGN PATENT DOCUMENTS

| | | | |
|---|---|---|---|
| 206142 | 11/1920 | Canada | 411/221 |
| 30866 | 7/1884 | Fed. Rep. of Germany | 411/221 |
| 673976 | 10/1929 | France | 411/223 |
| 1179404 | 12/1958 | France | 411/223 |
| 62282 | 9/1912 | Switzerland | 411/223 |
| 161114 | 4/1921 | United Kingdom | 411/223 |

*Primary Examiner*—Thomas J. Holko
*Assistant Examiner*—Lloyd A. Gall
*Attorney, Agent, or Firm*—R. S. Sciascia; Henry Hansen

[57] ABSTRACT

A self-retaining locking assembly for threaded couplings. An externally threaded bolt rod end bearing is threadedly secured to a nut or internally threaded piston rod. The bearing includes an axially extending keyway along the threads, and the piston rod includes a circumferential groove at the mating end as well as radially extending slots in the mating face. An annular lock member has a lug projecting radially inwardly of the central aperture for engaging the keyway, and ribs and clips for mating with the radial slots and annular groove, respectively, when the rod is threaded upon the bearing. The lock member therefore cannot rotate relative to the bearing, and the piston rod cannot rotate relative to the lock member whereby the entire assembly is secured together in fixed relationship.

1 Claim, 7 Drawing Figures

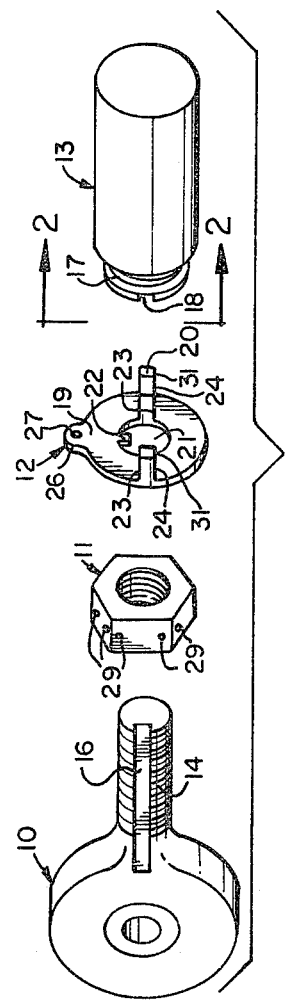
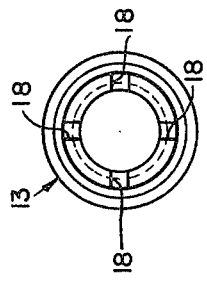
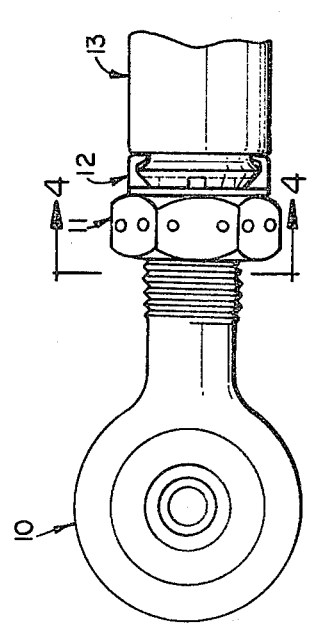
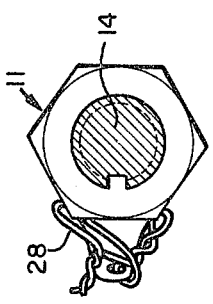
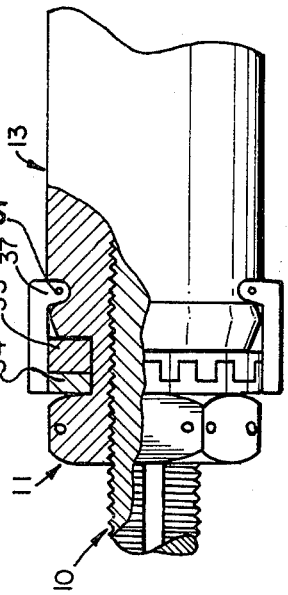
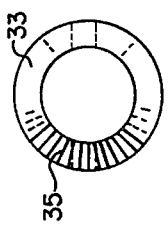
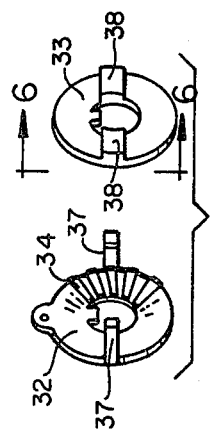

SELF-RETAINING LOCKING ASSEMBLY FOR THREADED COUPLINGS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to improvements in locking devices, and more particularly to locking devices for threaded couplings.

Commonly used locking devices for coupled nuts and bolts require a jam nut and a safety wire to prevent inadvertent disengagement of the elements. Omission or failure of the safety wire and loosening of the jam nut will permit relative rotation of the threaded parts and result in disorientation of machine elements or even their complete disconnection. Where the threaded parts connect critical components such as aircraft structure, this could result in catastrophic consequences.

SUMMARY OF THE INVENTION

Accordingly, it is an object of the present invention to provide a locking assembly for threaded couplings which does not depend on a jam nut or safety wire to insure positive locking of the threaded members. Another object is to provide a locking member which is self-retaining and will fix and maintain the rotational position of the threaded members with respect to each other in a desired orientation. Still another object of the invention is to provide a locking member which is particularly suitable for conventional manufacturing techniques such as investment casting, sheet metal stamping and bending, and which affords savings in cost and time for securing threaded couplings without the need for a jam nut.

Briefly, these and other objects of the invention are accomplished with a locking assembly wherein an externally threaded member is adapted to be threadedly secured to an internally threaded member. The externally threaded member is provided with an axially extending keyway along the threads, and the internally threaded member is provided with a circumferential groove and radial slots at the mating end thereof. An annular lock member fits over the externally threaded rod end and includes a key projecting radially inwardly of the central aperture to register with the keyway. Radial ribs and retaining clips extending from one side of the lock member mate with the slots and groove, respectively, of the internally threaded member when the latter is threaded upon the externally threaded member. Therefore, the entire assembly is secured together against unthreading.

Other objects and features of the invention will be readily apparent to those skilled in the art from the following description made in connection with the accompanying drawings wherein:

BRIEF DESCRIPTION OF THE DRAWINGS

FIG. 1 is an exploded perspective view of a preferred embodiment of a locking assembly according to the invention;

FIG. 2 is an end view of a piston rod of FIG. 1 as viewed along the line 2—2;

FIG. 3 is an assembled view of the locking assembly of FIG. 1;

FIG. 4 is a sectional view of the locking assembly taken along the line 4—4 of FIG. 3 with safety wires added;

FIG. 5 is an exploded view of an alternate embodiment of a lock member according to the invention;

FIG. 6 is an end view of an element of FIG. 5 taken along the line 6—6; and

FIG. 7 is an assembled view of a locking assembly including the lock member of FIG. 5.

DESCRIPTION OF THE PREFERRED EMBODIMENT

Referring now to the drawings wherein like characters designate like or corresponding parts throughout the several views, FIG. 1 shows the locking assembly as comprising a rod end bearing 10, a jam nut 11, a lock member 12, and a piston rod 13. Bearing 10 includes an externally threaded shank 14 with a slot or keyway 16 axially extending along the length of the threads. Jam nut 11 threadingly engages the shank 14. The end of rod 13 is internally threaded to receive the threaded shank 14 and includes a circumferential groove 17 at the mating end and four radially extending slots 18 in the mating face. As shown in FIG. 2, slots 18 are orthogonally arranged relative to each other.

Lock member 12, interposed between jam nut 11 and the mating end of rod 13, includes an annular base 19 with an aperture 21 for sliding along the length of shank 14. A key tab 22 projecting inwardly of the aperture 21 engages keyway 16 thereby preventing rotation about shank 14. A pair of opposed radial ribs 23 extend from one face of base 19 for mating with corresponding radial slots 18 when rod 13 is threaded upon shank 14. A pair of opposed retaining clips 24 also extend from the one face of base 19 and terminate with inwardly projecting detents 20 for mating with the groove 17. The axial position of groove 17 is such that the detents 20 will not engage unless ribs 23 are fully inserted in slots 18, and the mating face is preferably angled to provide a ramp for urging clips 24 outward as member 12 is pressed against rod 13. Locking member 12 further includes a tab 26 with a small hole 27 to accommodate a safety wire 28 (FIG. 4) threaded through adjacent holes 29 about the jam nut 11 thereby providing added safety against loosening of jam nut 11.

Operation of the locking assembly should now be apparent. With jam nut 11 and lock member 12 separated along shank 14, rod 13 is threaded onto shank 14 the desired amount. Bearing 10 is then positioned to align ribs 23 of locking member with a selected pair of slots 18 in rod 13 for one of four rotational positions. Member 12 is then pressed into intimate contact with the mating end of rod 13 so that ribs 23 and detents 20 are seated in slots 18 and groove 17 respectively. Jam nut 11 can be tightened against member 12 and safety wire 28 fastened. Thus, bearing 10 and rod 13 are prevented from unscrewing or tightening. The jam nut 11, when tightened against member 12, eliminates any clearance between the threads of the mating parts to ensure a rigid connection; but even if jam nut 11 were loosened or omitted, retaining clips 24 will hold member 12 in position to prevent relative rotation of the threaded parts.

The assembly of FIG. 3 may be disengaged by backing off jam nut 11 and spreading clips 24 out of groove 17. Holes 31 at the ends of the clips 24 are provided for receiving mating prongs of a conventional hand-operated spreading tool, not shown.

Referring now to the alternative embodiment of the locking member illustrated in FIGS. 5, 6 and 7, there is shown two annular bases 32 and 33 having radial teeth 34 and 35 on confronting surfaces for intermeshing with each other. A pair of retaining clips 37 extend from the base 32 for engaging the annular groove 17 on rod 13, and radial ribs 38 extending from base 33 register with the slots 18 of rod 13. With this embodiment, a wider selection of rotational positions of the threaded members is provided.

Some of the many advantages and novel features of the invention should now be apparent. For example, a positive locking assembly for threaded couplings is provided which is self retaining and fixes the rotational orientation of the threaded members. The assembly uses component parts which are particularly suitable for conventional manufacturing techniques, and provides a low cost coupling which can be quickly assembled and disassembled.

It will be understood that various changes in the details, steps and arrangement of parts, which have been herein described and illustrated in order to explain the nature of the invention, may be made by those skilled in the art within the principle and scope of the invention as expressed in the appended claims.

What is claimed is:

1. A self-retaining locking assembly for a threaded coupling comprising, in combination:
   first rod means externally threaded at one end having a keyway along the threaded length thereof, said first rod means including a free end;
   second rod means internally threaded at one end and threadedly engaged to and encompassing said free end of said first rod means, and having a continuous groove about the circumference of said one end and continuous radial slots on the face of said one end extending from the internal threads to the outer circumference;
   locking means slidable along the threaded length of said first rod means including a flat annular base, a radially inwardly extending lug from a central aperture of said base, and radial bosses on one face of said base simultaneously mating with said keyway and said slots respectively, and further including a resilient clip means axially extending from said one face of said base and terminating in detent means releasably engaging said groove when said lug and bosses are fully registered with said keyway and said slots, said locking means having a smooth planar surface on the exposed surface thereof; and
   a jam nut threadedly engaging said first rod means for engaging the locking means and reducing the thread clearance of said coupling.

* * * * *